(12) United States Patent
Saito

(10) Patent No.: US 12,358,385 B2
(45) Date of Patent: Jul. 15, 2025

(54) NON-CONTACT CHARGING SYSTEM

(71) Applicant: TOYOTA JIDOSHA KABUSHIKI KAISHA, Toyota (JP)

(72) Inventor: Hirotaka Saito, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 18/386,689

(22) Filed: Nov. 3, 2023

(65) Prior Publication Data

US 2024/0181902 A1 Jun. 6, 2024

(30) Foreign Application Priority Data

Dec. 6, 2022 (JP) .................. 2022-195039

(51) Int. Cl.
*B60L 53/124* (2019.01)
*B60L 53/62* (2019.01)

(52) U.S. Cl.
CPC ............. *B60L 53/124* (2019.02); *B60L 53/62* (2019.02); *B60L 2240/80* (2013.01)

(58) Field of Classification Search
CPC ..... B60L 53/124; B60L 53/62; B60L 2240/80
USPC ......................................................... 307/104
See application file for complete search history.

(56) References Cited

U.S. PATENT DOCUMENTS

| 2015/0311725 | A1* | 10/2015 | Yamamoto | .............. | H02J 50/60 |
| | | | | | 307/104 |
| 2018/0034305 | A1* | 2/2018 | Lee | .................... | H02J 7/007192 |
| 2021/0197677 | A1* | 7/2021 | Terada | .................... | B60L 53/39 |

FOREIGN PATENT DOCUMENTS

| JP | 2012-165497 A | 8/2012 |
| JP | 2015-109716 A | 6/2015 |
| JP | 2021-197862 A | 12/2021 |

* cited by examiner

*Primary Examiner* — Michael R. Fin
(74) *Attorney, Agent, or Firm* — Oliff PLC

(57) ABSTRACT

A non-contact charging system includes: a power transmission coil; a living body detector; a vehicle; a power reception coil; an auxiliary battery; and a control device. Further, the control device adjust a detection range of the living body detector, and starts the charging control in a case where the control device determines that the charging control is not executed and that a state in which there is no living body detected within the detection range continues for a predetermined time or more in a state where the vehicle is stopped immediately above the power transmission coil.

2 Claims, 6 Drawing Sheets

NON-CONTACT CHARGING SYSTEM

CROSS-REFERENCE TO RELATED APPLICATION (S)

The present application claims priority to and incorporates by reference the entire contents of Japanese Patent Application No. 2022-195039 filed in Japan on Dec. 6, 2022.

BACKGROUND

The present disclosure relates to a non-contact charging system.

Japanese Laid-open Patent Publication No. 2015-109716 discloses a non-contact charging system including: a power transmission coil installed on the ground; and a power reception coil mounted on a vehicle, in which power is transmitted from the power transmission coil to the power reception coil in a non-contact manner, and a battery of the vehicle is charged with power received by the power reception coil.

SUMMARY

There is a need for providing a non-contact charging system capable of inhibiting non-contact charging from not being started in a state where the vehicle is stopped immediately above the power transmission coil.

According to an embodiment, a non-contact charging system includes: a power transmission coil installed on ground in parking space; a living body detector that detects a living body near the power transmission coil; a vehicle that is allowed to be stopped in the parking space; a power reception coil that is mounted on the vehicle and that receives power transmitted from the power transmission coil in a non-contact manner; an auxiliary battery that is mounted on the vehicle and that stores power received by the power reception coil; and a control device that executes charging control of supplying, to the auxiliary battery, power transmitted from the power transmission coil to the power reception coil in a non-contact manner. Further, the control device adjusts a detection range of the living body detector, and, starts the charging control in a case where the control device determines that the charging control is not executed and that a state in which there is no living body detected within the detection range continues for a predetermined time or more in a state where the vehicle is stopped immediately above the power transmission coil.

DETAILED DESCRIPTION

In the related art, in a non-contact charging system including a charging facility with a power transmission coil and a vehicle with a power reception coil, it is conceivable to automatically start non-contact charging by using a timer or the like in a state where the vehicle is stopped in parking space having the charging facility. An auxiliary battery of the vehicle, however, may be exhausted at the time when a set charging start time comes. When the auxiliary battery is exhausted, a control device mounted on the vehicle cannot be activated. Charging is thus not started even when the set charging start time comes.

A non-contact charging system in an embodiment of the present disclosure will be specifically described below. Note that the present disclosure is not limited to the embodiment to be described below.

Figure 1:
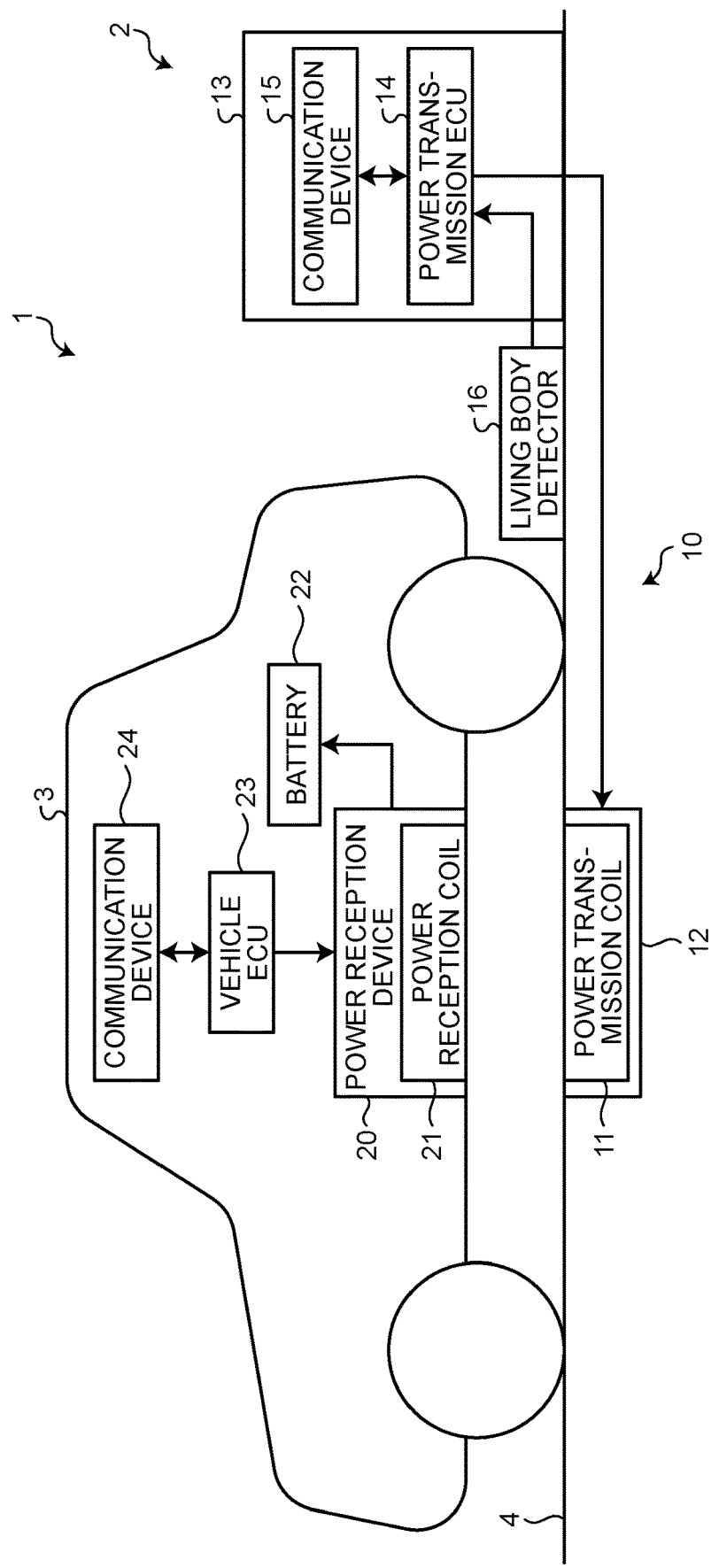
FIG. 1 is a schematic diagram illustrating a non-contact charging system according to an embodiment.

FIG. 1 is a schematic diagram illustrating a non-contact charging system according to an embodiment. A non-contact charging system 1 includes a charging facility 2 and a vehicle 3. The non-contact charging system 1 can transmit power from the charging facility 2 to the vehicle 3 in a non-contact manner in a state where the vehicle 3 is stopped. The non-contact charging system 1 includes a non-contact power transmission system.

The charging facility 2 supplies power to the vehicle 3, and is provided in a parking lot of a commercial facility, a garage of a house, and the like. The charging facility 2 includes a power transmission device 10 and an AC power supply 30 that supplies power to the power transmission device 10. The AC power supply 30 is a commercial power supply or a household power supply.

The power transmission device 10 includes a power transmitter 12 and a wall box 13. The power transmitter 12 includes a power transmission coil 11. The wall box 13 is connected to the AC power supply 30. The power transmitter 12 is installed on ground 4 in parking space. The wall box 13 is installed near the parking space, for example, on a wall of the parking lot. The power transmitter 12 and the wall box 13 are electrically connected. Power is supplied from the wall box 13 to the power transmitter 12. The wall box 13 is connected to the AC power supply 30. Power is supplied from the AC power supply 30 to the wall box 13. The wall box 13 includes a power converter. The power converter converts AC power supplied from the AC power supply 30 into transmission power, and outputs the transmission power to the power transmitter 12. In the power transmission device 10, the power from the AC power supply 30 is supplied to the power transmitter 12 via the power converter.

Furthermore, the power transmission device 10 includes a power transmission ECU 14 and a communication device 15. The power transmission ECU 14 controls the power converter. The communication device 15 communicates with the vehicle 3. The power transmission ECU 14 and the communication device 15 are provided in the wall box 13.

The power transmission ECU 14 includes a processor and a memory (main storage). The processor includes a central processing unit (CPU), a digital signal processor (DSP), a field-programmable gate array (FPGA), and a graphics processing unit (GPU). The memory includes a random access memory (RAM) and a read only memory (ROM). Signals from various sensors are input to the power transmission ECU 14. The power transmission ECU 14 executes various controls based on the signals input from the various sensors. For example, the power transmission ECU 14 controls a switching element included in the power converter to adjust the transmission power.

The communication device 15 wirelessly communicates with the vehicle 3 parked in the parking space. The communication device 15 transmits information from the power transmission ECU 14 to the vehicle 3, and receives information transmitted from the vehicle 3. The communication device 15 can perform wireless communication by using, for example, Wi-Fi (registered trademark) and a wireless LAN.

Furthermore, the charging facility 2 includes a living body detector 16 that detects a living body (e.g., person and animal) near the power transmission coil 11.

Figure 2:
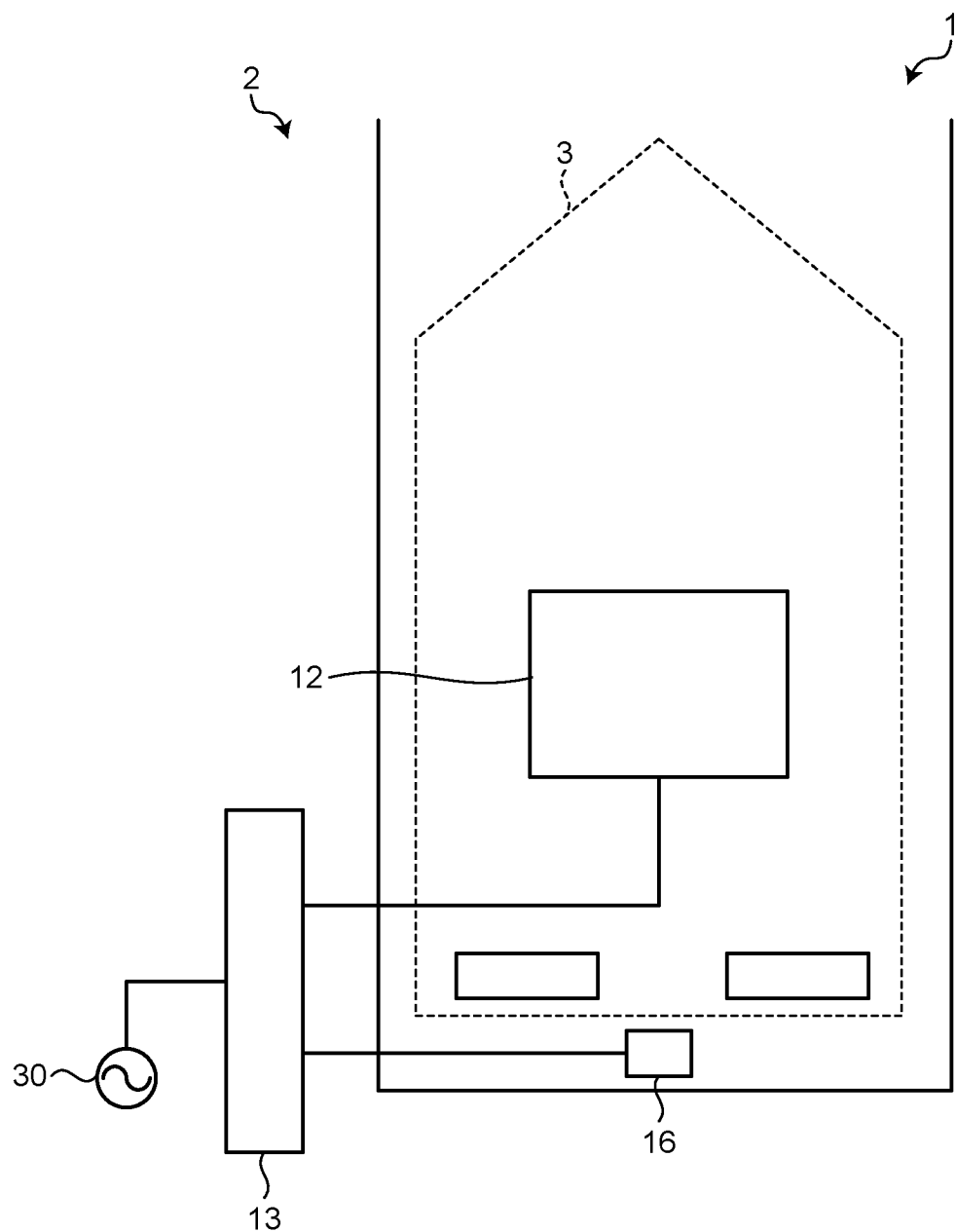
FIG. 2 is a schematic diagram illustrating a state where a vehicle is stopped immediately above a power transmission coil.

The living body detector 16 detects entering of a living body into a detection range of a predetermined distance from the power transmission coil 11. For example, the living body detector 16 includes a Doppler sensor and a laser sensor. As illustrated in FIG. 2, the living body detector 16 is disposed on the rear side of the parking space such that the power transmitter 12 is included in the detection range. The living body detector 16 is a device on a ground side installed in the parking lot together with the power transmission device 10. The living body detector 16 is electrically connected to the wall box 13.

In the non-contact charging system 1, the living body detector 16 exerts a living object detection (LOD) function. The LOD function is a living body detection function. A magnetic field is generated near the power transmission coil 11 during non-contact charging, which raises concerns about an influence of exposure to the magnetic field on a cardiac pacemaker. Therefore, when detecting the entering of a living body into the detection range, the living body detector 16 outputs a detection signal to the power transmission ECU 14. When the detection signal is input from the living body detector 16 during the non-contact charging, the power transmission ECU 14 stops the non-contact charging.

The vehicle 3 is an electric vehicle that can be charged with power supplied from an external power supply, and includes, for example, a battery electric vehicle (BEV) and a plug-in hybrid electric vehicle (PHEV). The vehicle 3 can be stopped in the parking space in which the power transmission coil 11 is installed. The vehicle 3 includes a power reception device 20, a battery 22, a vehicle ECU 23, and a communication device 24. The battery 22 stores power received by the power reception device 20. The vehicle ECU 23 controls the vehicle 3.

The power reception device 20 includes a power reception coil 21. The power reception coil 21 receives power transmitted from the power transmission coil 11 in a non-contact manner. The power reception device 20 supplies power received from the power transmission device 10 to the battery 22. The power transmission device 10 and the battery 22 are electrically connected with each other.

The battery 22 is an in-vehicle battery that can be externally charged. The battery 22 includes a secondary battery that stores the power supplied from the power reception device 20.

The vehicle ECU 23 is a vehicle control device mounted on the vehicle 3. The vehicle ECU 23 has a hardware configuration similar to that of the power transmission ECU 14. The vehicle ECU 23 executes various vehicle controls based on signals input from various sensors mounted on the vehicle 3 and information acquired by communication using the communication device 24. The vehicle control includes non-contact charging control. In the non-contact charging control, power is transmitted from the power transmission coil 11 to the power reception coil 21 in a non-contact manner, and the power reception coil 21 stores the received power in the battery 22.

The communication device 24 wirelessly communicates with an external device. The communication device 24 wirelessly communicates with the communication device 15 of the power transmission device 10. The communication device 24 transmits information from the vehicle 3 to the power transmission device 10, and receives information transmitted from the power transmission device 10 to the vehicle 3.

The non-contact charging system 1 performs the non-contact charging from the power transmission device 10 to the vehicle 3 with wireless communication being established between the vehicle 3 and the power transmission device 10. That is, power is transmitted in a non-contact manner from the power transmission coil 11 on the ground side to the power reception coil 21 on a vehicle side with the vehicle 3 and the power transmission device 10 being paired by wireless communication. Then, control of supplying the power received by the power reception coil 21 to the battery 22 is performed in the vehicle 3. The battery 22 includes a main battery 25 and an auxiliary battery 26. The main battery 25 supplies power to a traveling motor. The auxiliary battery 26 supplies power to the vehicle ECU 23. The output voltage of the main battery 25 is higher than the output voltage of the auxiliary battery 26.

Figure 3:
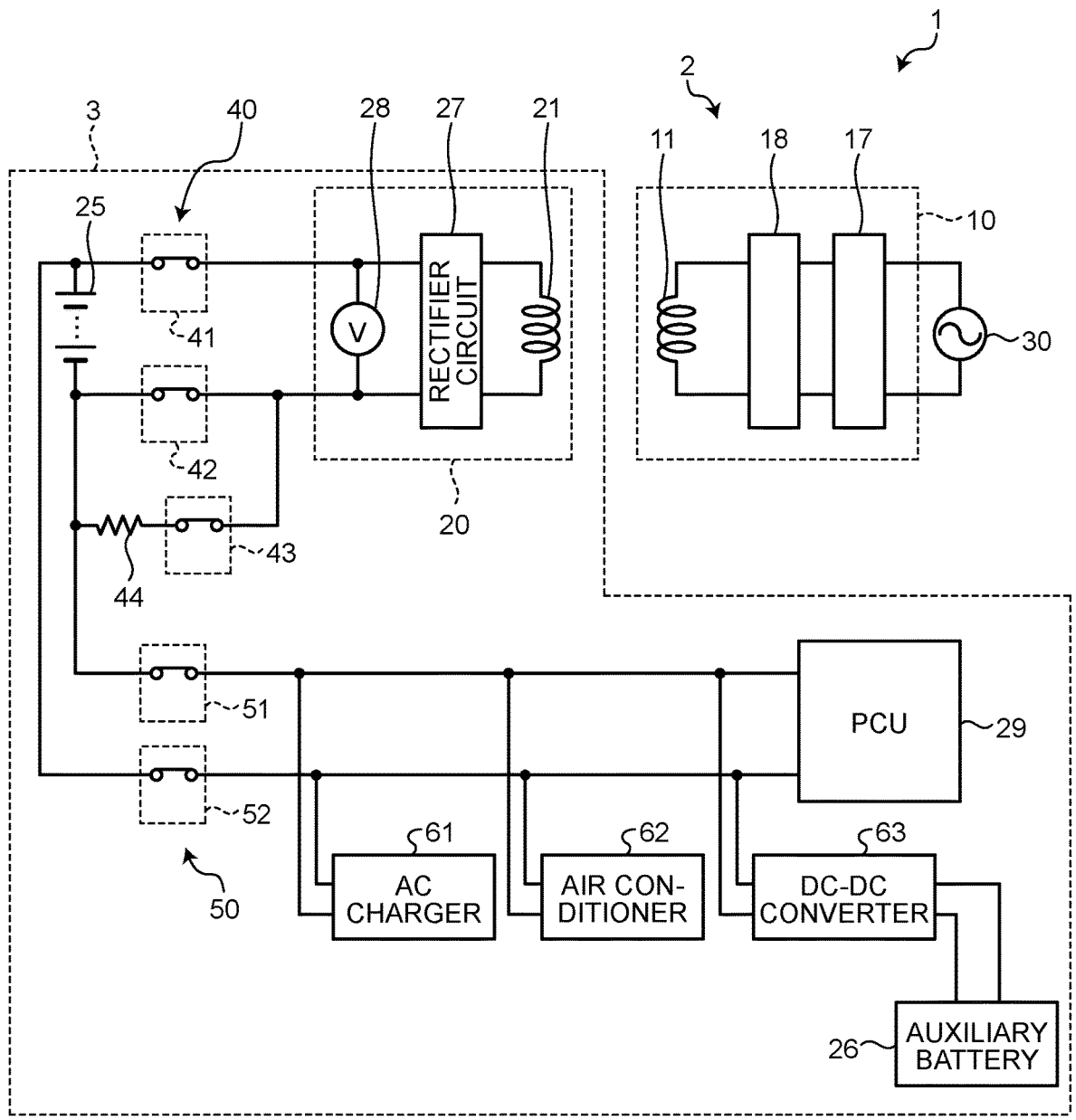
FIG. 3 is a schematic diagram illustrating high-voltage circuits of the non-contact charging system.

FIG. 3 illustrates high-voltage circuits of the non-contact charging system. FIG. 3 illustrates a high-voltage circuit included in the power transmission device 10 on the ground side and a high-voltage circuit included in the vehicle 3.

The power transmission device 10 includes a PFC circuit 17, an inverter 18, and the power transmission coil 11.

The PFC circuit 17 improves the power factor of AC power input from the AC power supply 30, converts the AC power into DC power, and outputs the DC power to the inverter 18. The inverter 18 converts the DC power input from the PFC circuit 17 into AC power. Each switching element of the inverter 18 includes an IGBT, and performs a switching operation in accordance with a control signal. The inverter 18 outputs the converted AC power to the power transmission coil 11. The PFC circuit 17 and the inverter 18 are power converters of the power transmission device 10, and are provided in the wall box 13.

The power transmission coil 11 transmits the AC power supplied from the inverter 18 to the power reception device 20 in a non-contact manner. The power transmission coil 11 forms an LC resonance circuit together with a resonance capacitor.

Note that the power transmission device 10 may include a filter circuit between the inverter 18 and the power transmission coil 11. In this case, the inverter 18 outputs the converted AC power to the filter circuit. The filter circuit removes noise included in the AC power input from the inverter 18, and supplies the AC power from which the noise has been removed to the power transmission coil 11. The power transmission coil 11 transmits the AC power supplied from the filter circuit to the power reception device 20 in a non-contact manner.

The power reception device 20 includes the power reception coil 21, a rectifier circuit 27, and a voltage sensor 28.

The power reception coil 21 receives power transmitted from the power transmission coil 11 in a non-contact manner. The power reception coil 21 forms an LC resonance circuit together with a resonance capacitor.

The rectifier circuit 27 converts the AC power input from the power reception coil 21 into DC power, and outputs the DC power to the main battery 25. The rectifier circuit 27 is configured as a full-bridge circuit in which four diodes are connected in a full-bridge manner as rectifier elements. Switching elements are connected in parallel to the diodes. Each switching element of the rectifier circuit 27 includes an IGBT, and performs a switching operation in accordance with a control signal. The rectifier circuit 27 supplies the converted DC power to the main battery 25.

The voltage sensor 28 is provided between the rectifier circuit 27 and the main battery 25, and detects the output voltage of the rectifier circuit 27.

Note that the power reception device 20 may include a filter circuit between the power reception coil 21 and the rectifier circuit 27. In this case, the filter circuit removes noise included in the AC power input from the power reception coil 21, and outputs the AC power from which the noise has been removed to the rectifier circuit 27. The rectifier circuit 27 converts the AC power input from the filter circuit into DC power, and outputs the DC power to the main battery 25.

A charging relay 40 is provided between the rectifier circuit 27 and the main battery 25. That is, the charging relay 40 is provided between the power reception device 20 and the main battery 25. The voltage sensor 28 is provided closer to the rectifier circuit 27 than the charging relay 40.

The charging relay 40 includes a positive electrode side relay 41, a negative electrode side relay 42, and a precharge charging relay 43. The positive electrode side relay 41 is provided on a positive electrode side power line of the main battery 25. The negative electrode side relay 42 is provided on a negative electrode side power line of the main battery 25. The precharge charging relay 43 is connected in series with a precharge resistor 44. When both the positive electrode side relay 41 and the negative electrode side relay 42 are closed, the power reception device 20 and the main battery 25 are connected so as to be energized. When both the positive electrode side relay 41 and the negative electrode side relay 42 are opened, the power reception device 20 and the main battery 25 are disconnected so as not to be energized.

The main battery 25 is a DC power supply that supplies power to the traveling motor of the vehicle 3. The traveling motor is electrically connected to the main battery 25 via a PCU 29. The main battery 25 is electrically connected to the PCU 29. For example, the main battery 25 includes a lithium-ion battery and a nickel hydrogen battery.

The PCU 29 is a power conversion device that converts DC power of the main battery 25 into AC power. The PCU 29 includes an inverter that drives the traveling motor. Each switching element of the PCU 29 includes an IGBT, and performs a switching operation in accordance with a control signal. The PCU 29 supplies the converted AC power to the traveling motor.

A system main relay 50 is provided between the main battery 25 and the PCU 29.

The system main relay 50 includes a positive electrode side relay 51 and a negative electrode side relay 52. The positive electrode side relay 51 is connected to the positive electrode side power line of the main battery 25. The negative electrode side relay 52 is connected to the negative electrode side power line of the main battery 25. When both the positive electrode side relay 51 and the negative electrode side relay 52 are closed, the main battery 25 and the PCU 29 are connected so as to be energized. When both the positive electrode side relay 51 and the negative electrode side relay 52 are opened, the main battery 25 and the PCU 29 are disconnected so as not to be energized.

An AC charger 61, an air conditioner 62, and a DC-DC converter 63 are connected to a power line between the system main relay 50 and the PCU 29.

The auxiliary battery 26 is electrically connected to the DC-DC converter 63. The DC-DC converter 63 adjusts power to be supplied to the auxiliary battery 26. The auxiliary battery 26 is connected to the main battery 25 via the DC-DC converter 63. The DC-DC converter 63 lowers the output voltage of the main battery 25, and supplies the lowered output voltage to the auxiliary battery 26.

The auxiliary battery 26 supplies power to the vehicle ECU 23. The vehicle ECU 23 is operated by the power supplied from the auxiliary battery 26. The auxiliary battery 26 is electrically connected to the power reception device 20 via the main battery 25. Therefore, during the non-contact charging, power received by the power reception device 20 can be stored in the main battery 25, and stored in the auxiliary battery 26. For example, the auxiliary battery 26 includes a lead acid battery. The auxiliary battery 26 is electrically connected to a low-voltage circuit including the vehicle ECU 23.

In the non-contact charging system 1, the auxiliary battery 26 is charged by connecting the system main relay 50 during charging and operating the DC-DC converter 63. In the charging, the main battery 25 is charged with power transmitted from the power transmission coil 11 to the power reception coil 21 in a non-contact manner.

Figure 4:
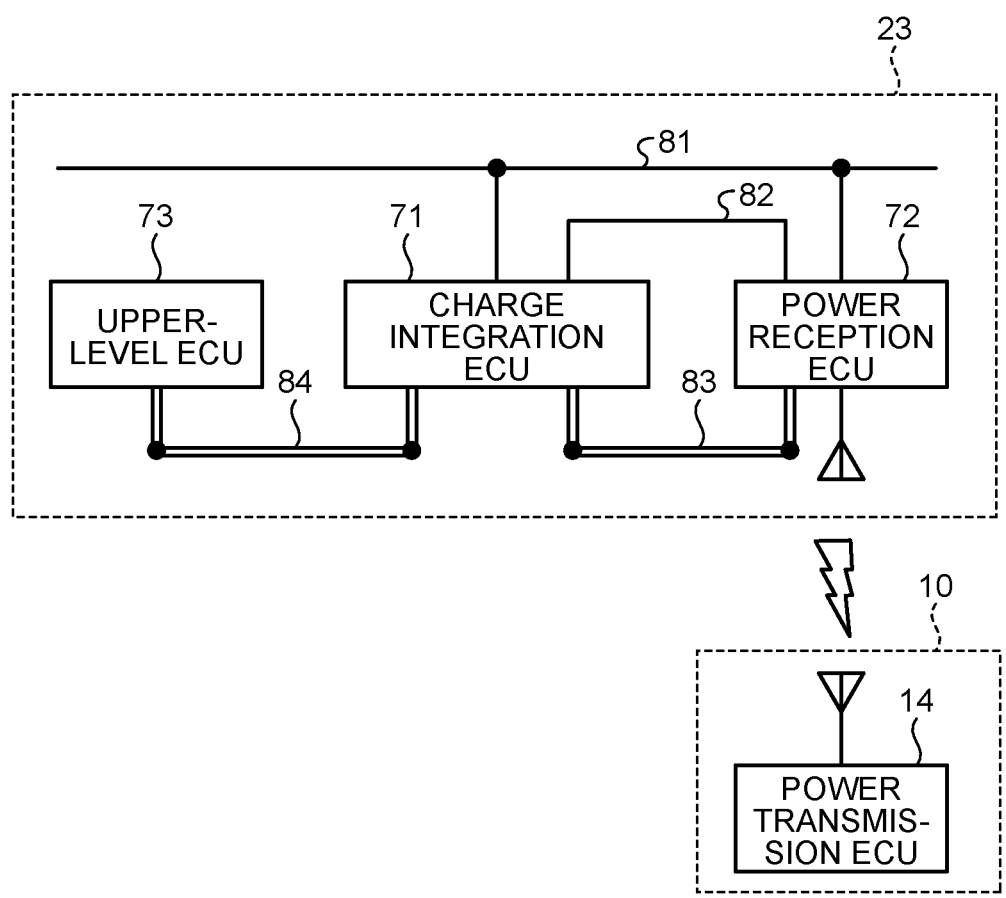
FIG. 4 illustrates a low-voltage circuit of the non-contact charging system.

FIG. 4 illustrates a low-voltage circuit of the non-contact charging system. A control device of the non-contact charging system 1 includes the vehicle ECU 23 on the vehicle side and the power transmission ECU 14 on the ground side.

The vehicle ECU 23 includes a plurality of control devices. The vehicle ECU 23 includes a charge integration ECU 71, a power reception ECU 72, and an upper-level ECU 73.

The charge integration ECU 71 is a control device that controls charging of the battery 22. The charge integration ECU 71 controls charging of the main battery 25, and controls charging of the auxiliary battery 26. Signals from various sensors mounted on the vehicle 3 are input to the charge integration ECU 71.

A signal from the voltage sensor 28 provided in the power reception device 20 is input to the power reception ECU 72. The power reception ECU 72 executes switching control of the rectifier circuit 27 based on a signal input from the voltage sensor 28. The power reception ECU 72 executes power control of controlling power to be supplied to the main battery 25 during non-contact charging. The power reception ECU 72 executes the power control during the non-contact charging, and controls each switching element of the rectifier circuit 27.

The power reception ECU 72 is a control device that controls non-contact charging using the power transmission device 10 and the power reception device 20. The power reception ECU 72 is a power reception ECU that controls the power reception device 20. The power reception ECU 72 outputs a control signal to the rectifier circuit 27, and controls each switching element of the rectifier circuit 27. Furthermore, the power reception ECU 72 can transmit and receive information to and from the power transmission ECU 14 on the ground side by wireless communication.

The upper-level ECU 73 is a control device that controls a traveling state of the vehicle 3. The upper-level ECU 73 is a traveling ECU that controls the PCU 29. The upper-level ECU 73 executes traveling control of controlling driving of the traveling motor.

The charge integration ECU 71, the power reception ECU 72, and the upper-level ECU 73 are all connected to a power line 81. The power line 81 electrically connects the vehicle ECU 23 and the auxiliary battery 26. Power of the auxiliary battery 26 is supplied to the charge integration ECU 71, the power reception ECU 72, and the upper-level ECU 73 via the power line 81.

Furthermore, the vehicle ECU 23 includes a first control device (ECU) and a second control device (ECU). The first control device is activated in a state where the vehicle 3 is stopped. The second control device is stopped in the state where the vehicle 3 is stopped. In this description, the state where the vehicle 3 is stopped indicates that the vehicle 3 is in a READY-OFF state, that is, the vehicle 3 is in an ignition-off state (IG-OFF state). The charge integration ECU 71 is activated in the state where the vehicle 3 is stopped. The power reception ECU 72 is stopped in the state where the vehicle 3 is stopped. The upper-level ECU 73 is stopped in the state where the vehicle 3 is stopped.

Therefore, the charge integration ECU 71 has a function of activating the power reception ECU 72 that is stopped. The charge integration ECU 71 is electrically connected to the power reception ECU 72 via a direct line 82. The charge integration ECU 71 outputs an activation signal to the power reception ECU 72 via the direct line 82. The power reception ECU 72 is activated when the activation signal is input from the charge integration ECU 71 while the vehicle 3 is stopped. The activated power reception ECU 72 can transmit and receive information to and from the power transmission ECU 14 on the ground side by wireless communication in a state where the vehicle 3 remains stopped.

Furthermore, activation of the power reception ECU 72 enables CAN communication between the power reception ECU 72 and the charge integration ECU 71. The charge integration ECU 71 and the power reception ECU 72 transmit signals via a local CAN bus 83. The charge integration ECU 71 transmits a control signal to the power reception ECU 72 via the local CAN bus 83. Moreover, the charge integration ECU 71 is connected to the upper-level ECU 73 via a CAN bus 84. The upper-level ECU 73 transmits a control signal to the charge integration ECU 71 via the CAN bus 84.

In the vehicle ECU 23 configured as described above, the power reception ECU 72 is stopped in the state where the vehicle 3 is stopped (READY-OFF state) while the charge integration ECU 71 continues to be activated by using power from the auxiliary battery 26. Therefore, voltage drop of the auxiliary battery 26 progresses due to power supply to the charge integration ECU 71 in addition to natural discharge. Then, the vehicle 3 is a battery electric vehicle or a plug-in hybrid electric vehicle. When the vehicle 3 is in the READY-OFF state for a long period of time, the voltage of the auxiliary battery 26 drops, and traveling of the vehicle 3 and a charging operation are made impossible. In order to prevent the voltage drop of the auxiliary battery 26, that is, so-called battery exhaustion, it is conceivable to monitor the voltage drop of the auxiliary battery 26 and charge the auxiliary battery 26, as necessary. A configuration in which the power reception ECU 72 is constantly activated for monitoring the voltage drop of the auxiliary battery 26, however, results in promoting the voltage drop of the auxiliary battery 26 by power consumption of the power reception ECU 72. Therefore, in the non-contact charging system 1, not the control device on the vehicle side but the control device on the ground side indirectly monitors the voltage of the auxiliary battery 26. Since the power transmission ECU 14 on the ground side is activated by using power from the AC power supply 30, the power consumption of the power transmission ECU 14 can be covered by power supply from the AC power supply 30.

Specifically, when the power transmission ECU 14 uses the LOD function and time obtained by integrating periods of time without entering of a living body is equal to or more than a predetermined time, the non-contact charging system 1 determines that the voltage of the auxiliary battery 26 has decreased. At that case, the charge integration ECU 71 and the power reception ECU 72 perform non-contact charging to drive the DC-DC converter 63, and charge the auxiliary battery 26. This can prevent the battery exhaustion of the auxiliary battery 26.

More specifically, when the power transmission device 10 is in a standby mode, the living body detector 16 is activated, and the living body detection function is enabled. When the vehicle 3 is stopped in the parking space but the non-contact charging is not performed, the power transmission device 10 is in a standby state, and the living body detector 16 is in an activated state. The power transmission ECU 14 in the standby state can detect entering of a living body into the detection range by using a signal from the living body detector 16. Therefore, the power transmission ECU 14 can indirectly determine the battery exhaustion of the auxiliary battery 26 by utilizing the LOD function. When determining that there is no person entering the detection range for a certain period of time, the power transmission ECU 14 determines that the voltage of the auxiliary battery 26 has decreased. Then, the power transmission ECU 14 and the power reception ECU 72 perform the non-contact charging in accordance with a determination result produced by the power transmission ECU 14 that there is no entering person for a certain period of time.

The vehicle side periodically activates the power reception ECU 72. The power reception ECU 72 and the power transmission ECU 14 communicate with each other to acquire information from the power transmission ECU 14. In the vehicle 3, the charge integration ECU 71 and a collation ECU continue to be activated even in the READY-OFF state (standby state in period of time during which user does not use vehicle 3). The collation ECU determines locking and unlocking of a door with a smart key and opening and closing of a slide door. The charge integration ECU 71 detects connection of a charging connector or a vehicle power connector to a charging inlet. Therefore, the power reception ECU 72 can be periodically activated by an activation signal from the charge integration ECU 71. At that case, the charge integration ECU 71 determines activation timing, and periodically activates the power reception ECU 72 by outputting an activation signal to the power reception ECU 72 via the direct line 82. The charge integration ECU 71 activates the power reception ECU 72 once a day, for example. The activated power reception ECU 72 establishes wireless communication with the power transmission device 10, and exchanges information. The power reception ECU 72 acquires information from the power transmission ECU 14 by the wireless communication with the power transmission device 10.

Then, the power reception ECU 72 determines whether to start the non-contact charging based on the information acquired from the power transmission ECU 14. When the information acquired from the power transmission ECU 14 indicates a determination result that there is no person entering the detection range for a certain period of time, that is, a determination result produced by the power transmission ECU 14 that the voltage of the auxiliary battery 26 decreases, the power reception ECU 72 determines that start of the non-contact charging is necessary. When determining that the start of the non-contact charging is necessary, the power reception ECU 72 starts to perform charging control. In contact, when determining that the start of the non-contact charging is unnecessary, the power reception ECU 72 stops again.

Figure 5:
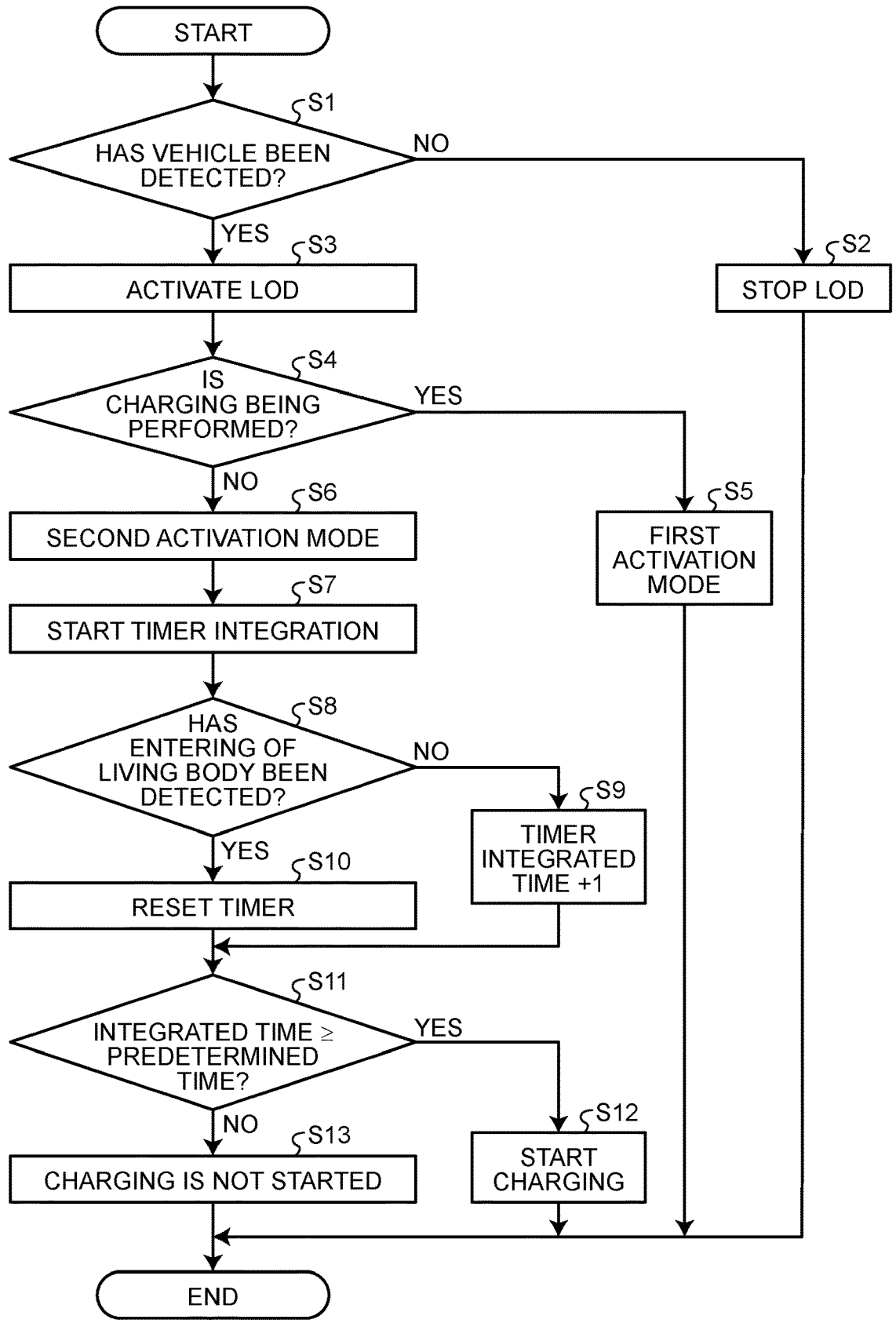
FIG. 5 is a flowchart illustrating a charging control flow.

FIG. 5 is a flowchart illustrating the charging control. The power transmission ECU 14 and the vehicle ECU 23 repeatedly execute the control in FIG. 5.

The power transmission ECU 14 determines whether the vehicle 3 has been detected (Step S1). In Step S1, the power transmission device 10 side determines whether the vehicle 3 is in the parking space. When the power transmission ECU 14 can be connected by Wi-Fi (registered trademark) with the vehicle 3, the power transmission ECU 14 determines that the vehicle 3 is in the parking space. That is, the power transmission ECU 14 determines whether there is the vehicle 3 paired by wireless communication. Alternatively, whether there is the vehicle 3 may be determined by installing a camera in the parking lot and the power transmission ECU 14 analyzing an image captured by the camera.

When determining that the vehicle 3 has not been detected (Step S1: No), the power transmission ECU 14 stops the LOD function (Step S2). In Step S2, the living body detector 16 is stopped. When the processing of Step S2 is performed, the control routine ends.

When determining that the vehicle 3 has been detected (Step S1: Yes), the power transmission ECU 14 enables the LOD function (Step S3). In Step S3, the living body detector 16 is activated.

The power transmission ECU 14 determines whether the non-contact charging is being performed (Step S4). In Step S4, whether power is transmitted from the power transmission coil 11 to the power reception coil 21 in a non-contact manner is determined. When configured to start the non-contact charging based on an instruction signal from the vehicle ECU 23, the power transmission ECU 14 may determine whether the non-contact charging is being performed by determining whether there is the instruction signal from the vehicle ECU 23. For example, the vehicle 3 includes a non-contact charging stop button as a button that can be operated by the user. In this case, the non-contact charging can be stopped by operating the button to output a stop instruction signal from the vehicle 3 to the power transmission device 10. Since the power transmission ECU 14 follows a charging instruction from the vehicle 3, charging execution is determined based on the charging instruction from the vehicle 3.

When determining that the non-contact charging is being performed (Step S4: Yes), the power transmission ECU 14 executes a first activation mode serving as an LOD activation mode (Step S5). The LOD activation mode is an activation mode of the living body detector 16.

The LOD activation mode includes the first activation mode and a second activation mode. The first activation mode and the second activation mode have a different detection range of the living body detector 16. In the first activation mode, a range at the time of normal non-contact charging is set as the detection range. In the second activation mode, a range expanded to a surrounding area of the vehicle 3 is set as the detection range. The detection range of the first activation mode corresponds to a detection range near the power transmission coil 11. The detection range of the second activation mode is expanded from the detection range of the first activation mode, and includes at least a driver seat of the vehicle 3. Then, the power transmission ECU 14 can switch the LOD activation mode between the first activation mode and the second activation mode. That is, the power transmission ECU 14 can adjust the detection range of the living body detector 16.

In Step S5, entering of a living body is monitored in the first activation mode. Since the non-contact charging is being performed, the detection range in the first activation mode is applied. When the vehicle 3 is parked immediately above the power transmission coil 11, the non-contact charging is started under control if coils fall within a range in which charging is possible. When the processing of Step S5 is performed, the control routine ends.

When determining that the non-contact charging is not being performed (Step S4: No), the power transmission ECU 14 executes the second activation mode serving as the LOD activation mode (Step S6). The power transmission ECU 14 adjusts the detection range of the living body detector 16 in accordance with whether the non-contact charging is being performed. Since the non-contact charging is not being performed, the detection range in the second activation mode is applied. When adjusting the detection range, the power transmission ECU 14 makes a detection range that is enabled in a situation in which the charging control is not executed larger than a detection range in which the charging control is being executed.

When the processing of Step S6 is performed, the power transmission ECU 14 starts integration of a timer (Step S7). In Step S7, measurement of the integrated time is started.

When the processing of Step S7 is performed, the power transmission ECU 14 determines whether entering of a living body into the detection range around the vehicle 3 has been detected (Step S8). In Step S8, whether there is a living body within a detection range in the second activation mode is determined. For example, when the user of the vehicle 3 returns to the vehicle 3, it is determined that a living body has entered the detection range.

When determining that the entering of a living body into the detection range around the vehicle 3 has not been detected (Step S8: No), the power transmission ECU 14 adds the integrated time of the timer (Step S9). In Step S9, the integrated time of the timer is added as +1.

When determining that the entering of a living body into the detection range around the vehicle 3 has been detected (Step S8: Yes), the power transmission ECU 14 resets the timer (Step S10). In Step S10, the integrated time of the timer is reset.

When the processing of Step S9 or the processing of Step S10 is performed, the power transmission ECU 14 determines whether the integrated time is equal to or longer than a predetermined time (Step S11). The predetermined time is preset. For example, the predetermined time is set to a time from when the vehicle 3 is stopped to when the voltage of the auxiliary battery 26 decreases to a predetermined value.

When determining that the integrated time is equal to or longer than a predetermined time (Step S11: Yes), the power transmission ECU 14 starts charging (Step S12). In Step S12, the power transmission ECU 14 determines that the voltage of the auxiliary battery 26 has decreased, and transmits information indicating the determination result to the power reception ECU 72. In Step S12, the vehicle ECU 23 and the power transmission ECU 14 execute the non-contact charging control. When determining that a situation in which charging control is not executed and a situation in which there is no living body within the detection range continue for a predetermined time or more in a state where the vehicle 3 is stopped immediately above the power transmission coil 11, the vehicle ECU 23 and the power transmission ECU 14 start the charging control. When the processing of Step S12 is performed, the control routine ends.

When determining that the integrated time is shorter than a predetermined time (Step S11: No), the power transmission ECU 14 does not start charging (Step S13). When the processing of Step S13 is performed, the control routine ends.

Figure 6:
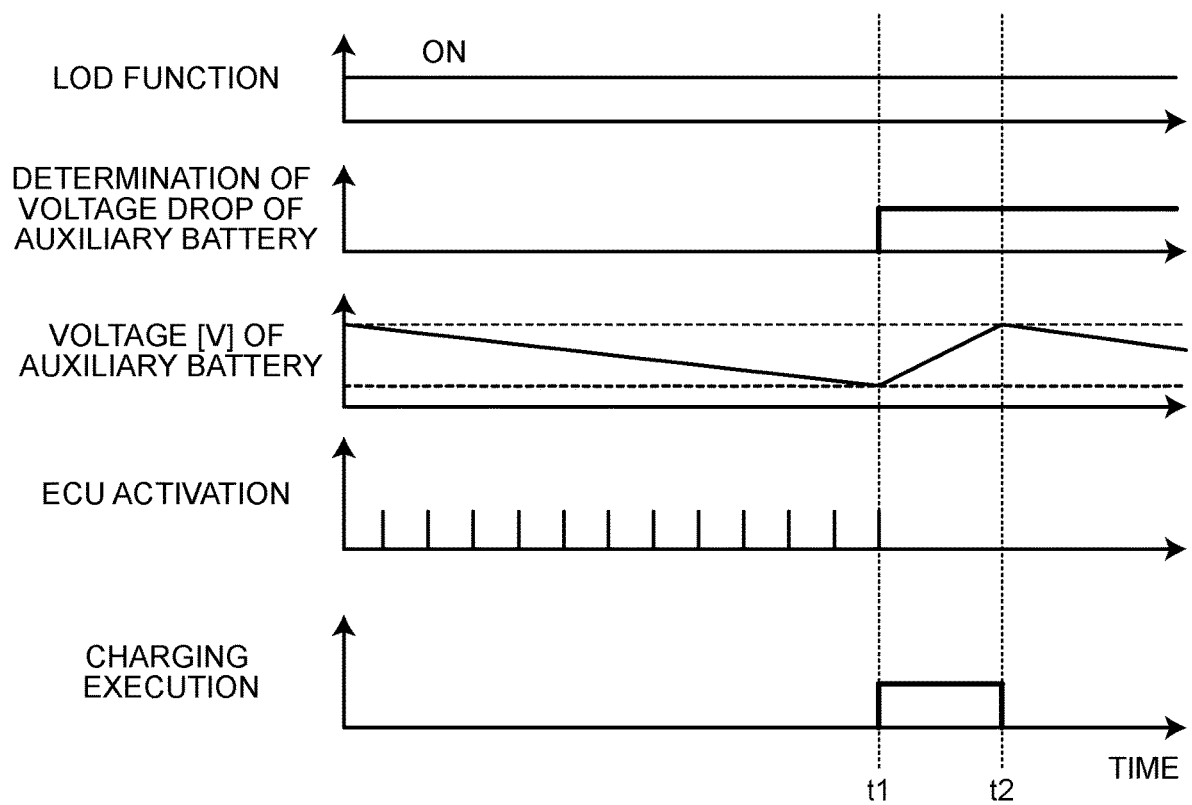
FIG. 6 is a time chart illustrating a case where an auxiliary battery is charged.

FIG. 6 is a time chart for illustrating a case where the charging control is executed. FIG. 6 illustrates a state where the vehicle 3 is stopped in the parking space.

In the state where the vehicle 3 is stopped in the parking space, the living body detector 16 is activated, and the LOD function is enabled. Since the non-contact charging is not performed in the state, the voltage of the auxiliary battery 26 decreases. Meanwhile, the charge integration ECU 71 periodically activates the power reception ECU 72. When the power reception ECU 72 is activated, wireless communication between the power reception ECU 72 and the power transmission ECU 14 is performed. At that case, the power reception ECU 72 determines whether the information acquired from the power transmission ECU 14 is information indicating that the integrated time is equal to or longer than a predetermined time (determination result indicating voltage drop). When determining that the information acquired from the power transmission ECU 14 is not information indicating that the integrated time is equal to or longer than a predetermined time, the power reception ECU 72 stops again.

Then, the power transmission ECU 14 determines that the integrated time is equal to or longer than a predetermined time (time t1). That is, at the time t1, the power transmission ECU 14 determines that the voltage of the auxiliary battery 26 has decreased. Therefore, when the power reception ECU 72 is activated at the time t1, the power reception ECU 72 determines that the information acquired from the power transmission ECU 14 is information indicating that the integrated time is equal to or longer than a predetermined time, and starts the non-contact charging. After the time t1, the charge integration ECU 71 and the power reception ECU 72 execute the non-contact charging control to charge the auxiliary battery 26 and charge the main battery 25. Then, when the charging of the auxiliary battery 26 is completed, the non-contact charging ends (time t2). The non-contact charging is performed for charging the auxiliary battery 26, and thus completed in a shorter time than charging of the main battery 25. For example, when it is determined that the voltage of the auxiliary battery 26 has increased to a predetermined value, the non-contact charging is ended. Note that, when the non-contact charging is completed, the state where the voltage drop of the auxiliary battery 26 is determined is canceled.

As described above, according to the embodiment, the voltage drop of the auxiliary battery 26 of the vehicle 3 can be indirectly determined by using the LOD function of the non-contact charging system 1 and the power transmission ECU 14 on the ground side. This makes it possible to prevent battery exhaustion of the auxiliary battery 26 while inhibiting power consumption of the control device on the vehicle side.

Note that the living body detector 16 may be installed not only on the ground side but on the vehicle side. When mounted on the vehicle 3, the living body detector includes, for example, an in-vehicle camera. The living body detector including the in-vehicle camera exerts the LOD function with the periphery of the vehicle 3 as a detection range. In this case, the living body detector on the vehicle side enables and activates the LOD function in a state where the vehicle 3 is stopped, and can output a signal to the power transmission ECU 14 on the ground side by wireless communication.

Furthermore, the power transmission device 10 is not necessarily required to include the wall box 13. The power transmission device 10 may be obtained by installing the power transmission ECU 14 and the communication device 15 on the ground 4 together with the power transmitter 12.

Furthermore, the charging facility 2 may be installed in a parking lot having a plurality of pieces of parking space. In this case, the power transmission device 10 is installed for each parking space.

According to the present disclosure, it is possible to inhibit non-contact charging from not being started in a state where a vehicle is stopped immediately above a power transmission coil.

According to an embodiment, it is possible to inhibit non-contact charging from not being started in a state where a vehicle is stopped immediately above a power transmission coil.

According to an embodiment, the non-contact charging can be performed before the voltage of an auxiliary battery becomes lower than a predetermined value.

According to an embodiment, when non-contact charging is not performed, entering of a living body can be detected in a range wider than a detection range in which the non-contact charging is being performed.

According to an embodiment, entering of a person into the periphery of a vehicle can be detected by utilizing a living body detector provided on a ground side.

According to an embodiment, it is determined that a predetermined time has elapsed before an auxiliary battery is exhausted. The exhaustion of the auxiliary battery can thus be prevented by performing non-contact charging in accordance with the determination result.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-contact charging system comprising:
   a power transmission coil installed on ground in parking space;
   a living body detector that detects a living body near the power transmission coil;
   a vehicle that is allowed to be stopped in the parking space;
   a power reception coil that is mounted on the vehicle and that receives power transmitted from the power transmission coil in a non-contact manner;
   an auxiliary battery that is mounted on the vehicle and that stores power received by the power reception coil; and
   a control device that executes charging control of supplying, to the auxiliary battery, power transmitted from the power transmission coil to the power reception coil in a non-contact manner,
   wherein the control device is configured to:
      adjust a detection range of the living body detector, and
      start the charging control in a case where the control device determines that the charging control is not executed and that a state in which there is no living body detected within the detection range continues for a predetermined time or more in a state where the vehicle is stopped immediately above the power transmission coil,
   wherein the predetermined time is set to a time from when the vehicle is stopped to when a voltage of the auxiliary battery decreases to a predetermined value,
   wherein, the control device adjusts the detection range in a manner that the detection range which is made effective when the charging control is not executed is wider than the detection range while the charging control is being executed, wherein the control device includes:
   a power transmission control device that controls a power transmission device including the power transmission coil; and
   a vehicle control device mounted on the vehicle,
the living body detector outputs a signal to the power transmission control device,
the auxiliary battery supplies power to the vehicle control device,
the vehicle control device includes:
   a first control device that is activated in a state where the vehicle is stopped; and
   a second control device that is stopped in the state where the vehicle is stopped,
the first control device is configured to:
   periodically transmit an activation signal in a state where the vehicle is stopped immediately above the power transmission coil, and
   periodically activate the second control device,
the power transmission control device is configured to:
   determine whether a period in which no living body enters the detection range is equal to or longer than the predetermined time based on the signal from the living body detector, and
   transmit the determination result to the second control device,
the second control device is configured to:
   be activated in accordance with an activation signal from the first control device,
   wirelessly communicate with the power transmission control device during the activation, and
   when acquiring information, which indicates that the period is equal to or longer than the predetermined time, from the power transmission control device, determine that the charging control is not executed and that the state in which there is no living body detected within the detection range continues for the predetermined time or more in the state where the vehicle is stopped immediately above the power transmission coil, and start the charging control.

2. The non-contact charging system according to claim 1, wherein the predetermined time is set to a time shorter than an elapsed time when the auxiliary battery was exhausted, and
the elapsed time is a time from when the vehicle is stopped to when the auxiliary battery is exhausted.

* * * * *